US006584423B2

(12) United States Patent
Duranton

(10) Patent No.: US 6,584,423 B2
(45) Date of Patent: *Jun. 24, 2003

(54) METHOD OF COMMUNICATION BETWEEN REMOTE TERMINALS AND A CENTRAL STATION

(75) Inventor: Marc Duranton, Boissy-Saint-Leger (FR)

(73) Assignee: Koninklijke Philips Electronics N.V., Eindhoven (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/182,698

(22) Filed: Oct. 29, 1998

(65) Prior Publication Data

US 2002/0062201 A1 May 23, 2002

(30) Foreign Application Priority Data

Nov. 4, 1997 (FR) .......................................... 97 13851

(51) Int. Cl.⁷ .............................................. G06F 15/16
(52) U.S. Cl. ........................ 702/122; 702/188; 709/201; 725/116; 725/117
(58) Field of Search ......................... 702/122, 62, 108, 702/119–121, 123, 177, 178, 182, 183, 186–188, FOR 103, FOR 104, FOR 131, FOR 134, FOR 135, FOR 159, FOR 170, FOR 171; 709/203, 223, 224, 229, 217, 102, 103, 200, 201; 712/31; 370/241, 449, 490, 493, 535–537, 542, FOR 135; 340/505, 574, 10.1, 825.06–825.08, 825.03, 825.52; 725/1, 2, 9, 11, 16, 30, 32–36, 82, 96, 101, 103, 110, 114–117; 348/180, 552; 700/2–4, 9, 12, 14, 19, 24, 27

(56) References Cited

U.S. PATENT DOCUMENTS

| 5,349,682 A | * | 9/1994 | Rosenberry ................. 709/102 |
| 5,815,793 A | * | 9/1998 | Ferguson .................... 709/201 |
| 5,819,034 A | * | 10/1998 | Joseph et al. ............... 709/201 |
| 5,835,717 A | * | 11/1998 | Karlton et al. .............. 709/217 |
| 5,995,134 A | * | 11/1999 | Hayashi ..................... 725/117 |
| 6,055,560 A | * | 4/2000 | Mills et al. ................. 709/200 |
| 6,098,091 A | * | 8/2000 | Kisor ........................ 709/102 |

OTHER PUBLICATIONS

"Overview of the MPEG–4 Version 1 Standard", Interional Organization for Standardisation, pps. 1–28, Oct. 1997.

Yanbin Yu and Dimitris Anastassiou, Software Implementatin of MPEG–II Video Encoding Using Socket Programming in LAN, Proc. of SPIE, Int. Soc. Opt. Eng. vol. 2187, pps 229–240, 1994 (No month).

* cited by examiner

Primary Examiner—Hal Wachsman

(57) ABSTRACT

The invention relates to a method of communication between terminals and a central server, in which these terminals, whose principal function is MPEG-2 decoding, are diverted from this function, on request and after authorization, in order to partake in parallel in the common implementation of an auxiliary function under control of said server.

7 Claims, 1 Drawing Sheet

METHOD OF COMMUNICATION BETWEEN REMOTE TERMINALS AND A CENTRAL STATION

FIELD OF THE INVENTION

The present invention relates to a method of communication between an arbitrary number of remote terminals and a central station, the terminals and the central station being interconnected by way of a communication path having an outgoing communication channel between the central station and the remote terminals and an incoming communication channel in the reverse direction. This invention is particularly useful in all situations in which costly computations should be made, which require very high computing powers, for example those carried out in meteorology, or in applications such as the decoding of the human genome, aeronautical computations etc.

BACKGROUND OF THE INVENTION

The growing interest in communication networks has induced researchers and the industry to develop so-called multimedia applications for the users. Since the additional possibilities provided by these applications (notably, interactivity and two-way communication) are not always based on standardized communication protocols, the MPEG group (Moving Pictures Expert Group) of the ISO (International Organization for Standardization) has endeavored to structure and standardize the processes of encoding and synchronization of transported information. Although this standard, which is named MPEG-4 and which is to be issued in 1998, competes with other solutions, it is likely that, in any case, the digital encoding terminals provided at the users will be equipped with powerful functions, particularly in order to enable the implementation of the additional possibilities mentioned above.

SUMMARY OF THE INVENTION

It is an object of the invention to provide a method of communication between a central server and remote terminals, which enables the remote terminals to be used in a novel manner as compared with their primary function, by conceiving more uses than those required for the simple application for which they were originally intended.

To this end, according to the invention, a communication method of the type defined in the opening paragraph of the description, is characterized in that the remote terminals are consumer products, respective individual users being able to start the activation of their corresponding principal function, and the method includes the following steps:

(A) a test step for the reception, by any one of the remote terminals, of a request for the activation of the remote terminal, which is addressed by the central station to start the activation of an auxiliary function which is autonomous with respect to the principal function;

(B) a test step for the availability and authorization for use, to transmit to the central station information relating to the availability of the remote terminals so requested;

(C) a step of transmitting data to the available remote terminals, the data relating to operations requested from these terminals by the central station in the scope of said auxiliary function;

(D) a step of carrying out the operations and returning the results of the operations carried out to the central station.

The principle of this method is as follows. On the one hand, these remote terminals have been (or, rather will be, because at present the decoding circuits are only cabled) provided with a return channel, i.e. a communication means between the remote terminals and the central server to which they are connected, so as to provide the interactivity. On the other hand, each of the remote terminals has (or will have) a powerful programmable multimedia processor, the functions of decoding, interactivity etc. being provided by software run on the processor. Finally, each remote terminal can be identified (the presence of an identification means is indispensable, for example, to effect deciphering in the case of coded or pay transmissions). When a remote terminal is not used for its principal function and it user does not prohibit this new activity, all these functions enable it to be employed in an alternative manner to realize a variety of functions, particularly computing functions. The computing power thus obtained can be very impressive at a minimal cost, providing that the operations or calculations to be carried out allow a modular division into small units which can be processed independently of one another.

It has already been proposed to replace an encoder of the MPEG-2 type by a combination of parallel work stations so as to assure a coordinated implementation of the MPEG-2 encoding algorithm. The document "Software implementation of MPEG-II video encoding using socket programming in LAN", Y. Yu et al., Proceedings of the SPIE, Int. Soc. Opt. Eng. (USA), Vol. 2187, pp. 229–240, describes such a solution. However, in the application, the principal function performed by the stations which operate in parallel remains the same as that originally envisaged and the described encoding means merely assure that, in contradistinction to what has been proposed in the case of the invention, the same principal function is carried out in, what may be called, an equivalent form.

In a special variant of the invention, the communication protocol thus defined provides means for the individual response of each remote terminal to the request send to it by the server. To this end, the method in accordance with the invention is characterized in that step (B) comprises a first test for activity of the remote terminal or remote terminals which have received an activation request, a second test for authorization to use the remote terminal for another activity, and an operation of responding to the central station in a time window specific to this terminal, to report its state of availability to said station.

When this variant is adopted, the method is preferably characterized in that the operation of addressing of each remote terminal by the central station is realized with the aid of an identification code for this remote terminal, and the specific position of the time window is defined by the identification code.

Regardless of the proposed variant, it is always particularly favourable that the central station transmits data of the application to be carried out to each available remote terminal in a language which is independent of the type of the relevant remote terminal.

Moreover, as in the case of the afore-mentioned variant, it is advantageous that in the implementation of the method step (D) is also effected in a time window specific to each of the remote terminals which have made themselves available.

Finally, in an improved variant of the method, in the case of activation of the principal function of a remote terminal, it also includes a step of storing the current state assumed by the respective terminal as a result of the progress of steps (A) to (D) when the auxiliary function has been activated.

BRIEF DESCRIPTION OF THE DRAWINGS

The features and advantages of the invention will become apparent from the following more detailed description with reference to the accompanying drawing (FIG. 1), which is a flow chart which shows the principal steps of the implementation of the communication method in each of the respective terminals.

DESCRIPTION OF PREFERRED EMBODIMENTS

Figure 1:
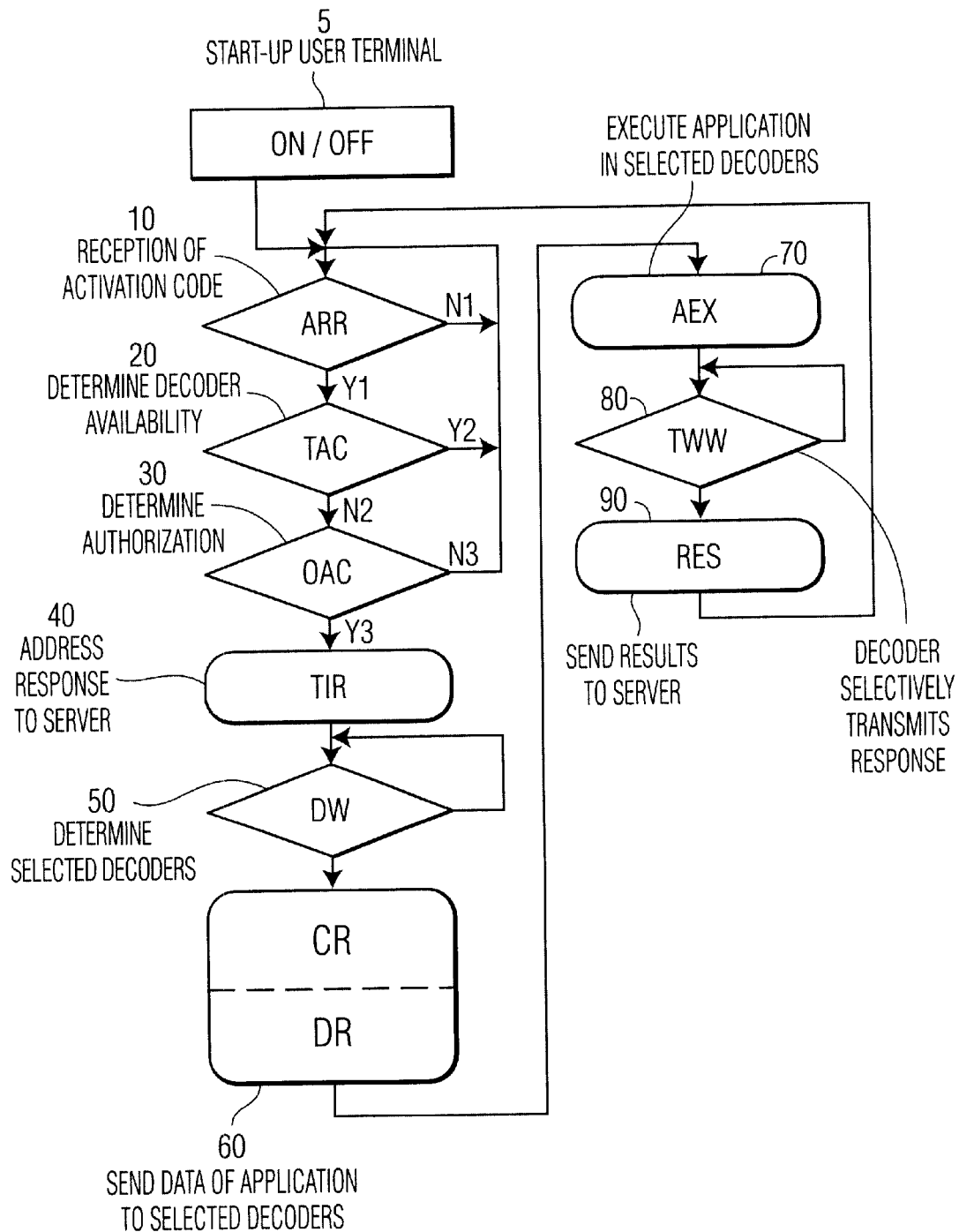

FIG. 1 illustrates the principle of the invention, which in a way is to use, in deviation from its primary use, the operational power, particularly the computing power, available in the remote terminals at the users' (in the present case video decoders, also referred to as set-top boxes) in order to obtain a huge reserve which can be used for very large projects. The flow chart thus represents the various steps of the communication method carried out in each of said terminals in conjunction with a central terminal. Step 5 refers to the prior start-up ("ON/OFF") of the relevant decoding terminal T(i) by the user, where i can assume very high values (one million, for example, which is, of course, not the limit). Once the terminal has been turned on, a first step 10 is the reception of an activation code (test ARR for reception of an activation request), requesting this terminal to put itself at the disposal of the central server in order to perform an (auxiliary) function other than its decoding function (which, in the present case, is its principal function).

Upon reception of this activation code (response Y1, whereas the response N1 corresponds to the absence of such reception) the relevant terminal can be in various states:

(a) either it is busy to perform its principal function of digital decoding (response Y2): in this case the request sent by the server is ignored or at least suspended until the terminal returns to the state of availability;

(b) or it is in the standby state (response N2) and the user is not using it but does not allow anyone else to do so (response N3); or (c) the terminal is in the standby state (N2) and the user allows it to be used (response Y3) for tasks other than its principal function.

The choice between (a) and (b) corresponds to the second step 20: this is the terminal activity test TAC, to which the response is either Y2 (the situation (a) given above), or N2 (the situation (b) referred to as standby). The choice between (b) and (c) corresponds to the third step 30: this is the test OAC whether or not authorization is given to use the terminal for another activity, to which the response is either N3 (the situation given above under (b): no authorization), or Y3 (the situation given above under (c): authorization granted).

When the regular user has granted authorization for the use of his terminal the subsequent steps of the implementation of the method comply with the following principles.

An essential step is, first of all, to have an exact method of addressing the terminals: for this purpose, a specific decoder characteristic is used (for example a function of the decoder access function or, rather, the serial number of this decoder, or else the number or a function of the number of the telephone line when the return channel is established via a telephone connection and a modem), which in general should then be loaded into a read-only memory. For example, it is possible to address 10,000 different decoders with an identification number of four symbols (XYZT, with the base 10 in the rest of the description, in order to simplify the explanation of the invention).

It is also possible to modulate this address, for example to assign an address code in groups of 100, such as: xyZT where x and y are fixed numbers whereas Z and T, the two other symbols, have arbitrary values.

Upon reception of the identification code (for example the above code: xyZT), all the decoders having the two first figures x and y in the same order know that the message following this identification code concerns them. In general, said following message will be the request asking whether the decoder is available or not and whether authorization for use is granted or not (steps 20 and 30, respectively). The decoder then addresses its response to the server in a well-defined time window (which operation is referenced TIR in FIG. 1 and corresponds to the step 40). This window depends, for example, on the two last digits Z and T not used in the identification code: if the code is 42ZT, decoder no. 4210 responds 10 seconds after reception of said code sent by the server, decoder no. 4237 responds after 37 seconds, and so on (the unit of time chosen in the present case, i.e. seconds, is only given by way of non-limitative example). This staggering of the decoder responses in the time makes it possible to avoid overloading of the return channel to the server.

On the basis of the responses from the available decoders the server can draw up its task list: if only two decoders are available in the group 42ZT and 98 decoders are available in the group 67ZT the server will send the same program to these groups 42ZT and 67ZT. Decoders which have responded positively to the request a first time store the nature of this response in a memory and are subsequently the only ones which (step 50) respond to subsequent requests from the server which relate to this group (until the server sends a zero reset signal to stop the operation in progress). This last-mentioned feature is useful in order to preclude that the decoders "get on the moving train" and respond to subsequent requests from the server while not having responded to the initial availability request.

When each decoder concerned has returned information relating to its availability to the server (step 40) and has assumed a waiting state (step 50, or DW) for the data (the key in the illustrated case being 4210) the server will send (step 60, which includes a sub-step CR in which the identification code is loaded and a sub-step DR in which the data is loaded) the data of the application to be carried out, the identification code enabling one or more selections of decoder groups to be made. In order to ensure that the invention functions independently of the physical architecture of the decoder the code and the data sent by the server can be in a language which is effectively independent of the hardware itself, for example in Java byte code. The application is carried out only (step 70 or AEX) by the decoders belonging to the selected group(s).

Once the requested operations have been carried out, each decoder sends the results to the server (step 90 or RES), preceded by the identification number of said decoder and in a response return sequence which depends on this identification number. The existence of this sequence means that, in fact, each decoder again waits to transmit its own response (step 80 or TWW) until time window for the transmission of this response is available, which window is associated with the specific code of the decoder (4210 in the example described and illustrated herein).

Obviously, the present invention is not limited to the example described, on the basis of which variants are conceivable.

For example, in the case that one group of decoders is numerically underrepresented (it includes only one decoder or a very small number of decoders) and the server plans to carry out numerous transactions with this group, it may be advantageous to temporarily change the numbers of said small number of decoders. In that case the server sends a new number to the decoder or to the group of decoders, which number is then preceded by a mark such as a signalling bit (for example referred to as "alternate" in all subsequent messages). When the server transmits a message with this "alternate" bit the decoders which have kept their original numbers for example respond first and subsequently allow the "alternate" decoders to respond likewise. This temporary numbering can be cancelled by a zero-reset message preceded by the provisional code allocated to the relevant group of decoders.

On the other hand, it has been seen that the step referenced 5 indicated the start-up of the decoder. As a matter of fact, the decoder is by default in a wake-up state, i.e. in a waiting state either for the activation of its principal function by the user or for its use by the central server. However, it is evident that the start-up step can also occur in any other step of the process shown in FIG. 1 (the user can activate the decoder for its principal function at an instant at which it has already been claimed by the server). In that case, two situations are possible:

(a) the decoder has reached at least the step 70 (carrying out the application requested by the server) and has enough internal resources to store the exact state in which it is (in the course of the operations requested by the server): it then saves its current state to proceed later when the user has stopped the execution of the principal function of the decoder;

(b) the decoder has not yet reached the step 70 or, when it has reached at least this step, it does not have enough resources to save its current state: when the user intervenes, it goes back to the state just preceding the step 10, without having given any response to the server.

Furthermore, it is evident that the results from a decoder can be returned to the server in one pass or, conversely, may require several turns, without this second solution falling beyond the scope of the invention.

In all the cases, the consumer terminals may be, for example, video decoders of MPEG type (MPEG-2 or MPEG-4 decoders especially).

What is claimed is:

1. A method of communication between an arbitrary number of remote terminals and a central station, said remote terminals and said central station being interconnected by means of a communication path having an outgoing communication channel between said central station and the remote terminals and an incoming communication channel in the reverse direction, wherein said remote terminals are consumer products, respective individual users being able to start the activation of the remote terminals corresponding principal function, and said method includes the follow steps:

(A) a test step for the reception, actively requested by any one of the remote terminals, of a request for the activation of said remote terminal, which is addressed by the central station to-start the activation of an auxiliary function that is autonomous and novel with respect to said principal function of said remote terminal;

(B) a test step for testing the availability of said any one of the remote terminals, and for inquiring whether authorization has been obtained for use, to transmit to said central station information relating to the availability of the remote terminals so requested;

(C) a step of transmitting data to the available remote terminals, said data relating to operations requested from these remote terminals by said central station in the scope of said auxiliary functions, so that the auxiliary functions are distributed among the remote terminals available and authorized in step (B); and (D) a step of carrying out said operation among the remote terminals performing the auxiliary function, and returning the results of the operations carried out to said central station for further processing/analysis.

2. The method as claimed in claim 1, wherein step (B) comprises a first test for activity of the remote terminal or remote terminals which have received an activation request, a second test for authorization to use said remote terminal for another activity, and an operation of responding to the central station in a time window specific to this remote terminal, to report the remote terminal's state of availability to said central station.

3. The method as claimed in claim 2, wherein in an operation of addressing of each remote terminal by the central station is realized with the aid of an identification code for each remote terminal, and the specific position of said time window is defined by said identification code.

4. The method as claimed in claim 2, wherein the central station transmits data of an application to be carried out to each available remote terminal in a language which is independent of the type of a relevant remote terminal.

5. The method as claimed in claim 2, wherein step (D) is also effected in a time window specific to each of the remote terminals which have been made available.

6. The method as claimed in claim 1, characterized in that, in the case of activation of the principal function of a remote terminal, the central station also includes a step of storing the current state assumed by the respective remote terminal as a result of the progress of steps (A) to (D) when the auxiliary function has been activated.

7. The method as claimed in claim 1, characterized in that said terminals comprise video decoders adapted for decoding according to MPEG (Motion Pictures Expert Group) standards.

* * * * *